(12) United States Patent
Kok

(10) Patent No.: US 6,340,296 B1
(45) Date of Patent: Jan. 22, 2002

(54) SYSTEM FOR PRODUCING OPTICAL DATA CARRIERS

(75) Inventor: Ronaldus Joannes Cornelis Maria Kok, Eindhoven (NL)

(73) Assignee: OTB Group B.V., Eindhoven (NL)

( * ) Notice: Subject to any disclaimer, the term of this patent is extended or adjusted under 35 U.S.C. 154(b) by 0 days.

(21) Appl. No.: 09/331,424

(22) PCT Filed: Dec. 8, 1997

(86) PCT No.: PCT/NL97/00672

§ 371 Date: Jul. 21, 1999

§ 102(e) Date: Jul. 21, 1999

(87) PCT Pub. No.: WO98/27552

PCT Pub. Date: Dec. 8, 1997

(30) Foreign Application Priority Data

Dec. 19, 1996 (NL) .............................................. 1004837

(51) Int. Cl.[7] .......................... B28B 17/00; B29C 45/17
(52) U.S. Cl. ............. 425/162; 204/298.26; 414/222.12; 425/403.1; 425/436 R; 425/436 RM; 425/810; 425/DIG. 201; 901/8
(58) Field of Search .......................... 425/403.1, 126.1, 425/556, 438, 806, 810, DIG. 201, 436 R, 436 RM, 162; 414/222.09, 222.12; 901/8, 11; 204/298.25, 298.26

(56) References Cited

U.S. PATENT DOCUMENTS

| | | | | |
|---|---|---|---|---|
| 4,521,807 A | * | 6/1985 | Werson ...................... 358/106 |
| 4,581,188 A | * | 4/1986 | Westermann, Jr. .......... 264/107 |
| 5,364,258 A | * | 11/1994 | Buckley et al. ............. 425/501 |
| 5,371,931 A | * | 12/1994 | Kawana et al. ............. 29/33 K |
| 5,403,397 A | * | 4/1995 | Beckers et al. ............. 118/620 |
| 5,567,366 A | * | 10/1996 | Motegi et al. ................ 264/39 |
| 5,650,110 A | * | 7/1997 | Padovani ..................... 264/153 |
| 5,780,205 A | * | 7/1998 | Beckers et al. ............. 430/320 |
| 6,082,987 A | * | 7/2000 | Su et al. ..................... 425/150 |

FOREIGN PATENT DOCUMENTS

| | | |
|---|---|---|
| EP | 0 528 106 | 2/1993 |
| EP | 0 737 968 | 10/1996 |
| WO | WO 88/01564 | 3/1988 |

* cited by examiner

*Primary Examiner*—Nam Nguyen
*Assistant Examiner*—Emmanuel Luk
(74) *Attorney, Agent, or Firm*—Young & Thompson

(57) ABSTRACT

A system for producing disc-like optical data carriers comprises an injection-molding machine for manufacturing a disc-like substrate, and a finishing device for applying a reflective layer to the substrate and for applying a protective layer to the reflective layer. The injection-molding machine and the finishing device are integrated in a single production unit. An optical inspection unit is also integrated in the production unit.

10 Claims, 2 Drawing Sheets

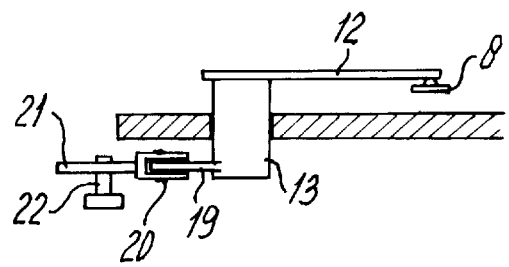
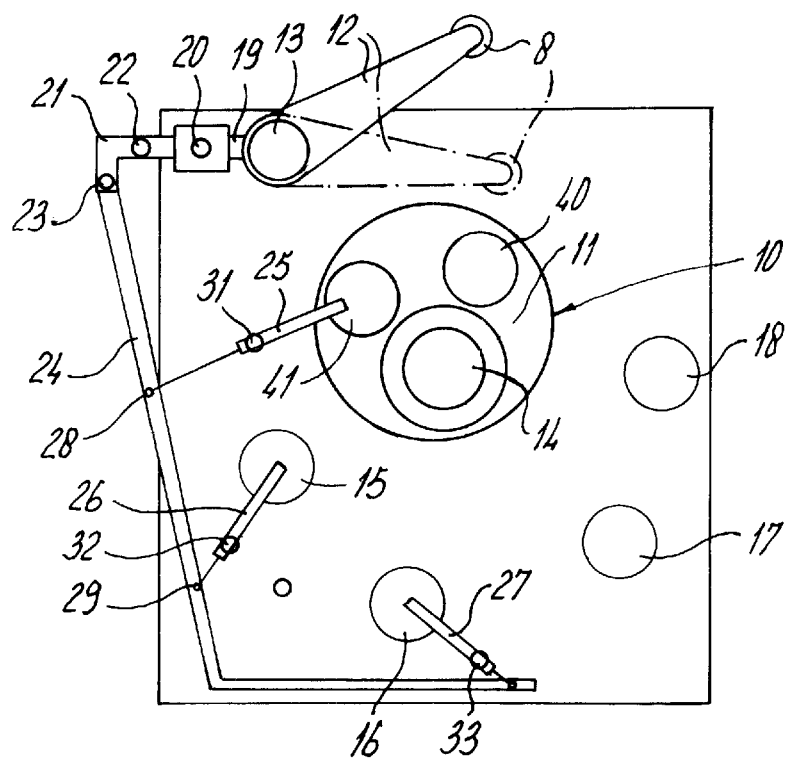
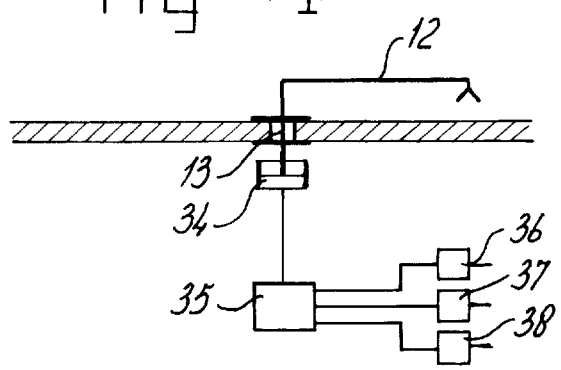

SYSTEM FOR PRODUCING OPTICAL DATA CARRIERS

BACKGROUND OF THE INVENTION

The invention relates to a system for producing disc-like optical data carriers, comprising an injection-moulding machine for manufacturing a disc-like substrate, a finishing device for applying a reflective layer to the substrate and for applying a protective layer to the reflective layer, as well as an optical inspection unit.

Systems of this kind are used for manufacturing, for example, memories, compact discs and the like. In the manufacturing process, the machines used have a high quality with regard to accuracy and maintaining a clean atmosphere and provide a high production rate. Such high requirements can only be met by machines which are developed specially for the particular purpose and are each suitable for carrying out one specific production step.

The result of this is that the known systems are of a very modular nature. This modular nature is intensified by the fact that these special machines are manufactured by various producers, each of which are specialists in their own field but do not have any significant experience outside this field. Each machine has its own specially designed control unit with a robot for feeding and removing the various products. This unit is only suitable for carrying out the task associated with that machine.

The known system therefore comprises a number of different components which have to be assembled by the supplier of the system to form a perfectly functioning unit which satisfies the high quality requirements referred to above.

The above means that first of all the injection-moulding machine has to be set up at the premises of the purchaser of the system, and only then can the finishing device be installed. Finally, the various control units with associated robots must be matched to one another in such a manner as to produce a system which operates at a sufficient rate and with sufficient quality.

In practice, it has been found that the so-called "transfer region" between the various machines often causes problems to the user of the system. Also, none of the relevant suppliers of the separate machines has proven able to ensure sufficient quality in this respect, thus resulting in loss of production. Furthermore, the existence of separate control units which are connected to one another by means of interfaces represents a high investment cost. Finally, the separate clean rooms of the various machines represent a significant item of expenditure.

A result of this traditional design of the known systems is that many components are present in duplicate, with the result that the cost price of the system is high. In the event of faults in the system, it is frequently unclear which of the various suppliers is responsible, thus resulting in loss of time and interruptions. An additional factor is that the possible combinations are legion. This can also cause errors and disruptions. An example of a system of this kind is known from JP-4221414.

A separate injection-moulding machine for disc-like recording media of this kind is known from EP-B-577,169. A separate finishing device, by means of which a layer of lacquer can be applied to a recording medium of this kind is known from EP-B-574,975.

SUMMARY OF THE INVENTION

The object of the invention is to provide a system which does not present these problems relating to machine the various production units to one another. This object is achieved by the fact that the injection-moulding machine, the finishing device and the inspection unit are integrated in a single production unit.

Integrating the various machines in one production unit has many advantages. First and foremost, a single control unit is sufficient for the entire system, so that there is no longer any need for interface connections and the risk of faults is considerably reduced. As a result of the fact that there is no need to perform complicated adapting operations, the system is ready for use almost immediately. There is less loss of production, particularly in the start-up phase, while the production costs fall by 30% or more.

Preferably, a printing unit is also integrated in the production unit.

In a particularly compact design of the system, the entire production unit is accommodated on a single machine frame.

A further significant advantage is that the machine frame can bear a single housing which defines a clean room. All the production steps take place in immediate succession in this single clean room, thus drastically limiting the risk of contamination.

The number of robots with separate control units and matching problems can be reduced. In this connection, it is possible to provide a removal arm which is displaceable between a position for removing the substrate from an injection mould associated with the injection-moulding machine and a position for placing the said substrate in the finishing device.

In a known manner, the finishing device may comprise a sputtering unit for applying a reflective layer of metal to the substrate. In this case, it is possible to provide a first transfer arm which is displaceable between a position for removing the substrate with a reflective layer from the sputtering unit and a position for placing the said substrate in the station for applying a protective layer.

Furthermore, it is possible to provide a second transfer arm which is displaceable between a position for removing the substrate with protective layer from the station for applying the protective layer and a position for placing the said substrate in a station for hardening the protective layer.

Finally, it is possible to provide a third transfer arm which is displaceable between a position for removing the substrate from the station for hardening the protective layer and a position for placing the said substrate in the optical inspection unit.

These arms do not have to interact with another robot arm, so that there will be no matching problems.

To simplify the overall transportation of the products through the system, the removal arm and each transfer arm are coupled together. This coupling may be implemented in various ways. According to a first possibility, the coupling of the arms is mechanical; according to a second possibility, the coupling of the arms is electronic.

In the latter case, the removal arm is connected to an incremental displacement sensor for detecting the displacement of the removal arm between its two limit positions, and each transfer arm is connected to a servomotor for moving the associated transfer arm between its two limit positions, which displacement sensor is coupled to each servomotor by means of a processing unit which emits control pulses to each servomotor on the basis of the signals emanating from the displacement sensor.

BRIEF DESCRIPTION OF THE DRAWINGS

The invention will be explained in more detail below with reference to an exemplary embodiment of the system according to the invention illustrated in the figures, in which:

FIGS. 3a, 3b show an embodiment with mechanical coupling of the arms.

FIG. 4 shows an embodiment with electronic coupling of the arms.

DESCRIPTION OF THE PREFERRED EMBODIMENT

Figure 1:
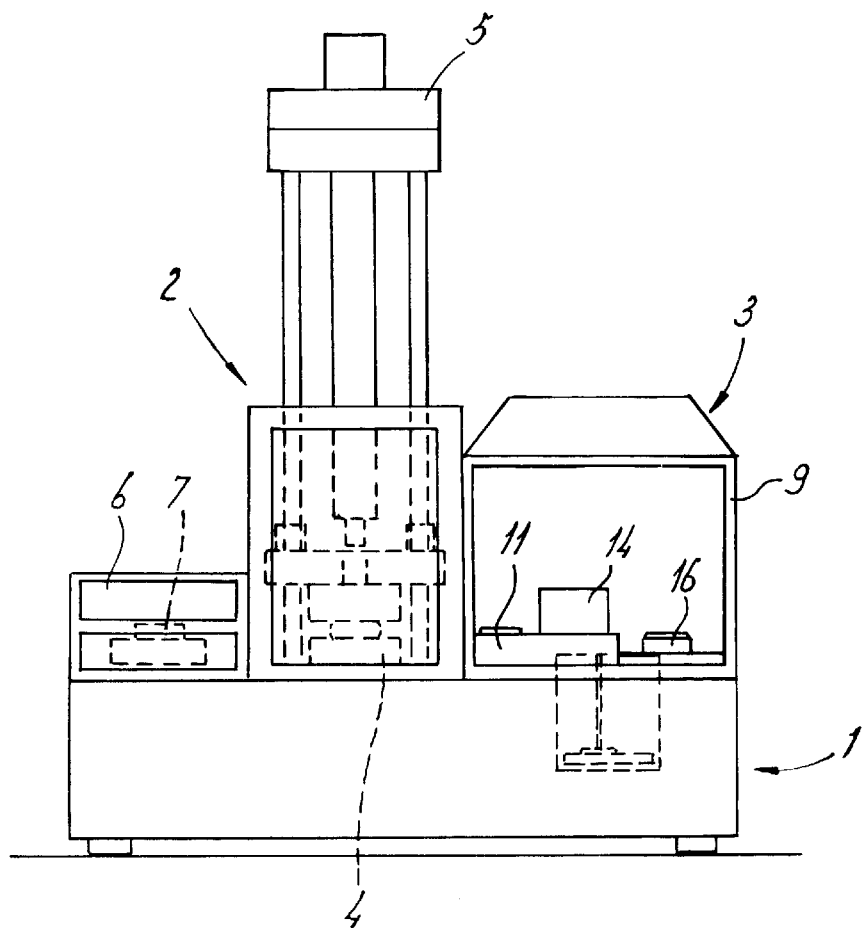
FIG. 1 shows a side view of the system according to the invention.

The system illustrated in FIG. 1 comprises a machine frame 1, on which there are accommodated an injection-moulding device, which is denoted overall by 2 and a finishing device, which is denoted overall by 3. The injection-moulding device 2 is known per se: it has a mould 4 which, in the production position, is situated beneath the injection unit 5.

A further mould 7 which can optionally be exchanged for the mould 4 is present in the casing 6.

Figure 2:
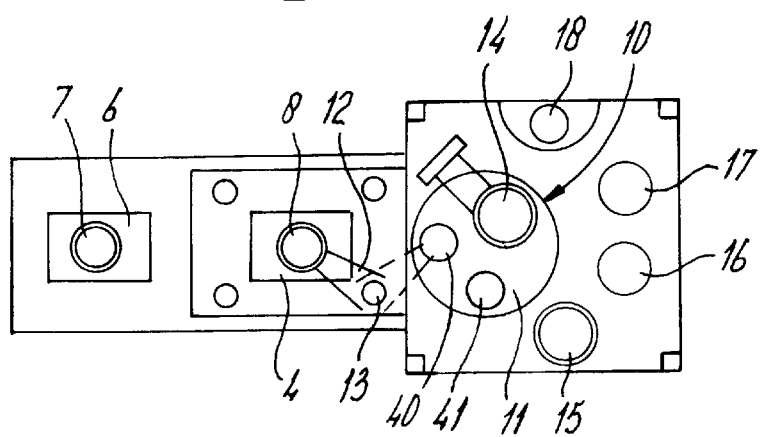
FIG. 2 shows a top view.

As is known, a disc-like substrate 8 as illustrated in the top view of FIG. 2 is manufactured in the injection-moulding device, which substrate acquires the positive image of the features of the mould.

According to the invention, the finishing device 3 is placed directly against the injection-moulding device 2. This finishing device firstly comprises a casing 9 which defines a closed space in which a controlled atmosphere can be maintained, as is necessary for a clean room.

In this finishing device 3 there is firstly accommodated a sputtering unit 10 which is known per se and comprises a drum 11 provided with a feed port 40 and a removal port 41. A substrate 8 manufactured in the injection-moulding device 2 can be placed in the sputtering unit 10 via the feed port 40 specifically by means of the removal arm 12. This removal arm can rotate about pin 13 and is movable between the position shown by solid lines, in which it is able to take the substrate out of the injection-moulding device 2 and the position shown by dashed lines for placing a substrate in the sputtering device 10.

A turntable (not shown) is situated in the drum 11 by means of which turntable the appropriate substrate can be placed beneath sputtering apparatus 14 so that a reflective layer of metal can be sputtered onto the substrate.

After the reflective layer has been applied to the substrate, the latter is moved beneath the removal port 41 after which the said substrate is placed, by means which will be described in more detail, successively on the station 15 for applying a protective layer of lacquer, the station 16 for curing the said layer of lacquer by means of UV light, and the station 17 for optically inspecting the finished product. Finally, the product can be discharged at station 18.

According to a first possibility, the movement between the various stations can be carried out using the mechanism illustrated in FIGS. 3a, 3b. In this mechanism, the removal arm 12 has an auxiliary arm, which is coupled via pivot 20 to tumbler 21. This tumbler can rotate about the fixed pivot 22.

The tumbler itself is connected, by means of pivot 23, to drive rod 24 to which transfer arms 25, 26 and 27 are pivotably attached by means of pivots 28, 29 and 30. Moreover, each of the arms are themselves rotatably attached to a fixed pivot 31, 32, 33.

On transferring, by means of the removal arm, a substrate 8 from the injection-moulding device 2 to one of the stations 11 of the sputtering device 10 the mechanical couplings ensure that all the transfer arms 25, 26, 27 are moved in such a manner that they transfer a substrate to the next station. The sequences of these movements has already been described in connection with FIG. 2.

In the variant illustrated in FIG. 4, the removal arm 12 is likewise held rotatably by means of pivot pin 13. An incremental displacement sensor 34 is attached to the end of the pivot pin 13 which sensor emits signals which measure the angular position of the removal arm 12. These signals are fed to the processing unit 35 which emits signals for controlling the servomotors 36, 37, 38 which are each attached (in a manner not shown) to one of the transfer arms 25, 26, 27.

What is claimed is:

1. A system for producing disc-like optical data carriers, comprising:

an injection-moulding machine for manufacturing a disc-like substrate;

a sputtering unit for applying a reflective layer to the substrate and for applying a protective layer to the reflective layer, wherein the injection-moulding machine and the sputtering unit are integrated in a single production unit;

a removal arm that is displaceable between a position for removing the substrate from an injection mould associated with the injection-moulding machine and a position for placing the substrate in the sputtering unit;

a first transfer arm that is displaceable between a position for removing the substrate with a reflective layer from the sputtering unit and a position for placing the substrate in a station for applying a protective layer;

a second transfer arm that is displaceable between a position for removing the substrate with the protective layer from the station for applying the protective layer and a position for placing the substrate in a station for hardening the protective layer; and a third transfer arm that is displaceable between a position for removing the substrate from the station for hardening the protective layer and a position for placing the substrate in an optical inspection unit;

the removal arm and each transfer arm being coupled together.

2. The system according to claim 1, in which a printing unit is integrated in the production unit.

3. The system according to claim 1, further comprising a machine frame that carries a single housing which defines a clean room in which the sputtering unit and the first, second, and third transfer arms are housed.

4. The system according to claim 1, in which the coupling of the removal and transfer arms is mechanical.

5. The system according to claim 1, in which the coupling of the removal and transfer arms is electronic.

6. The system according to claim 5, in which the removal arm is connected to an incremental displacement sensor for detecting the displacement of the removal arm between its two limit positions, and each transfer arm is connected to a servomotor for moving the associated transfer arm between its two limit positions, which displacement sensor is coupled to each servomotor by means of a processing unit which emits control pulses to each servomotor on the basis of the signals emanating from the displacement sensor.

7. A system for producing disc-like data carriers, the system comprising:

an injection molding machine that forms a disc-like substrate and a finishing device that further processes a substrate formed in the injection molding machine, said finishing device comprising first, second, and third processing units that each sequentially perform different operations on the substrate;

a frame that supports said injection molding machine and said finishing device directly adjacent to each other;

a removal arm carried by one of said injection molding machine and said finishing device for transferring a substrate from said injection molding machine to said first processing unit;

a first transfer arm carried by said finishing device for transferring a substrate from said first processing unit to said second processing unit;

a second transfer arm carried by said finishing device for transferring a substrate from said second processing unit to said third processing unit; and a coupling unit that operates said removal arm and said first and second transfer arms simultaneously so that respective substrates are moved from said injection molding machine to said first processing unit, from said first processing unit to said second processing unit, and from said second processing unit to said third processing unit at the same time.

8. The system of claim 7, further comprising a clean room on said frame, wherein said first, second, and third processing units are within said clean room.

9. The system of claim 8, wherein said coupling unit comprises a mechanical linkage translating movement of said removal arm to said first and second transfer arms.

10. The system of claim 8, further comprising first and second motors for driving said first and second transfer arms, respectively, and wherein said coupling unit comprises an electronic linkage translating movement of said removal arm to said first and second motors.

* * * * *